(12) United States Patent
Bushnell et al.

(10) Patent No.: US 10,890,978 B2
(45) Date of Patent: Jan. 12, 2021

(54) ELECTRONIC DEVICE WITH AN INPUT DEVICE HAVING A HAPTIC ENGINE

(71) Applicant: Apple Inc., Cupertino, CA (US)

(72) Inventors: Tyler S. Bushnell, Mountain View, CA (US); Benjamin J. Kallman, Cupertino, CA (US); David M. Pelletier, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/800,723

(22) Filed: Feb. 25, 2020

(65) Prior Publication Data

US 2020/0233495 A1    Jul. 23, 2020

Related U.S. Application Data

(63) Continuation of application No. 15/366,674, filed on Dec. 1, 2016, now Pat. No. 10,585,480.

(60) Provisional application No. 62/334,036, filed on May 10, 2016.

(51) Int. Cl.
   *G06F 3/01*        (2006.01)
   *G06F 3/02*        (2006.01)
   *G06F 3/0362*      (2013.01)

(52) U.S. Cl.
   CPC .............. *G06F 3/016* (2013.01); *G06F 3/02* (2013.01); *G06F 3/0362* (2013.01)

(58) Field of Classification Search
   CPC .......... G06F 3/016; G06F 3/02; G06F 3/0362; G06F 3/0202
   USPC ....................................................... 345/184
   See application file for complete search history.

(56) References Cited

U.S. PATENT DOCUMENTS

| 5,196,745 A | 3/1993 | Trumper et al. |
| 5,293,161 A | 3/1994 | MacDonald et al. |
| 5,424,756 A | 6/1995 | Ho et al. |
| 5,434,549 A | 7/1995 | Hirabayashi et al. |
| 5,436,622 A | 7/1995 | Gutman et al. |
| 5,668,423 A | 9/1997 | You et al. |
| 5,842,967 A | 1/1998 | Kroll |
| 5,739,759 A | 4/1998 | Nakazawa et al. |
| 6,084,319 A | 7/2000 | Kamata et al. |
| 6,342,880 B2 | 1/2002 | Rosenberg et al. |

(Continued)

FOREIGN PATENT DOCUMENTS

| CN | 101036105 | 9/2007 |
| CN | 201044066 | 4/2008 |

(Continued)

OTHER PUBLICATIONS

U.S. Appl. No. 10/232,714, filed Mar. 2019, Wachinger.

(Continued)

*Primary Examiner* — Hirdepal Singh
(74) *Attorney, Agent, or Firm* — Brownstein Hyatt Farber Schreck, LLP

(57) ABSTRACT

An electronic device is configured to provide haptic feedback to a user based on an input action associated with an input device. The electronic device includes a haptic engine operably connected to a processing device. The haptic engine includes an electromagnetic actuator that detects an input action associated with the input device. The electromagnetic actuator also produces a haptic output in response to the detection of the input action.

20 Claims, 12 Drawing Sheets

(56) References Cited

U.S. PATENT DOCUMENTS

| | | |
|---|---|---|
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,554,191 B2 | 4/2003 | Yoneya |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,321,180 B2 | 1/2008 | Takeuchi et al. |
| 7,323,959 B2 | 1/2008 | Naka et al. |
| 7,336,006 B2 | 2/2008 | Watanabe et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,576,477 B2 | 8/2009 | Koizumi |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,188,989 B2 * | 5/2012 | Levin .................... G06F 3/0362 345/184 |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,264,465 B2 | 9/2012 | Grant et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,572 B2 | 3/2013 | Marsden et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,432,365 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,628,173 B2 | 1/2014 | Stephens et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,653,785 B2 | 2/2014 | Collopy |
| 8,654,524 B2 | 2/2014 | Pance et al. |
| 8,681,130 B2 | 3/2014 | Adhikari |
| 8,686,952 B2 | 4/2014 | Burrough |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,797,295 B2 | 8/2014 | Bernstein |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,890,824 B2 | 11/2014 | Guard |
| 8,907,661 B2 | 12/2014 | Maier et al. |
| 8,976,139 B2 | 3/2015 | Koga et al. |
| 8,976,141 B2 | 3/2015 | Myers et al. |
| 8,977,376 B1 | 3/2015 | Lin et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,046,947 B2 | 6/2015 | Takeda |
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,116,570 B2 | 8/2015 | Lee et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,182,837 B2 | 11/2015 | Day |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |

(56) References Cited

U.S. PATENT DOCUMENTS

| | | |
|---|---|---|
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez |
| 9,449,476 B2 | 9/2016 | Lynn et al. |
| 9,459,734 B2 | 10/2016 | Day |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,519,346 B2 | 12/2016 | Lacroix |
| 9,535,500 B2 | 1/2017 | Pasquero et al. |
| 9,539,164 B2 | 1/2017 | Sanders et al. |
| 9,542,028 B2 | 1/2017 | Filiz et al. |
| 9,557,830 B2 | 1/2017 | Grant |
| 9,557,857 B2 | 1/2017 | Schediwy |
| 9,563,274 B2 | 2/2017 | Senanayake |
| 9,564,029 B2 | 2/2017 | Morrell et al. |
| 9,594,429 B2 | 3/2017 | Bard et al. |
| 9,600,037 B2 | 3/2017 | Pance et al. |
| 9,600,071 B2 | 3/2017 | Rothkopf |
| 9,607,491 B1 | 3/2017 | Mortimer |
| 9,632,583 B2 | 4/2017 | Virtanen et al. |
| 9,639,158 B2 | 5/2017 | Levesque |
| 9,666,040 B2 | 5/2017 | Flaherty et al. |
| 9,707,593 B2 | 7/2017 | Berte |
| 9,710,061 B2 | 7/2017 | Pance et al. |
| 9,727,238 B2 | 8/2017 | Peh et al. |
| 9,733,704 B2 | 8/2017 | Cruz-Hernandez |
| 9,762,236 B2 | 9/2017 | Chen |
| 9,829,981 B1 | 11/2017 | Ji |
| 9,830,782 B2 | 11/2017 | Morrell et al. |
| 9,857,872 B2 | 1/2018 | Terlizzi et al. |
| 9,870,053 B2 | 1/2018 | Modarres |
| 9,874,980 B2 | 1/2018 | Brunet et al. |
| 9,875,625 B2 | 1/2018 | Khoshkava et al. |
| 9,886,090 B2 | 2/2018 | Silvanto et al. |
| 9,902,186 B2 | 2/2018 | Whiteman et al. |
| 9,904,393 B2 | 2/2018 | Frey et al. |
| 9,921,649 B2 | 3/2018 | Grant et al. |
| 9,927,887 B2 | 3/2018 | Bulea |
| 9,927,902 B2 | 3/2018 | Burr et al. |
| 9,928,950 B2 | 3/2018 | Lubinski et al. |
| 9,940,013 B2 | 4/2018 | Choi et al. |
| 9,977,499 B2 | 5/2018 | Westerman et al. |
| 9,996,199 B2 | 6/2018 | Park et al. |
| 10,025,399 B2 | 7/2018 | Kim et al. |
| 10,037,660 B2 | 7/2018 | Khoshkava et al. |
| 10,061,385 B2 | 8/2018 | Churikov |
| 10,069,392 B2 | 9/2018 | Degner et al. |
| 10,078,483 B2 | 9/2018 | Finnan et al. |
| 10,082,873 B2 | 9/2018 | Zhang |
| 10,108,265 B2 | 10/2018 | Harley et al. |
| 10,110,986 B1 | 10/2018 | Min |
| 10,120,446 B2 | 11/2018 | Pance et al. |
| 10,120,478 B2 | 11/2018 | Filiz et al. |
| 10,120,484 B2 | 11/2018 | Endo et al. |
| 10,122,184 B2 | 11/2018 | Smadi |
| 10,133,351 B2 | 11/2018 | Weber et al. |
| 10,139,976 B2 | 11/2018 | Iuchi et al. |
| 10,146,336 B2 | 12/2018 | Lee et al. |
| 10,152,131 B2 | 12/2018 | Grant |
| 10,152,182 B2 | 12/2018 | Haran et al. |
| 10,209,821 B2 | 2/2019 | Roberts-Hoffman et al. |
| 10,235,034 B2 | 3/2019 | Jitkoff et al. |
| 10,235,849 B1 | 3/2019 | Levesque |
| 10,254,840 B2 | 4/2019 | Weinraub |
| 10,261,585 B2 | 4/2019 | Bard et al. |
| 10,275,075 B2 | 4/2019 | Hwang et al. |
| 10,284,935 B2 | 5/2019 | Miyoshi |
| 10,289,199 B2 | 5/2019 | Hoellwarth |
| 10,346,117 B2 | 7/2019 | Sylvan et al. |
| 10,372,214 B1 | 8/2019 | Gleeson et al. |
| 10,382,866 B2 | 8/2019 | Min |
| 10,390,139 B2 | 8/2019 | Biggs |
| 10,394,326 B2 | 8/2019 | Ono |
| 10,397,686 B2 | 8/2019 | Forstner |
| 10,430,077 B2 | 10/2019 | Lee |
| 10,437,359 B1 | 10/2019 | Wang et al. |
| 10,531,191 B2 | 1/2020 | Macours |
| 10,556,252 B2 | 2/2020 | Tsang et al. |
| 10,585,480 B1 | 3/2020 | Bushnell et al. |
| 10,649,529 B1 | 5/2020 | Nekimken et al. |
| 10,809,830 B2 | 10/2020 | Kim et al. |
| 2003/0117132 A1 | 6/2003 | Klinghult |
| 2005/0036603 A1 | 2/2005 | Hughes |
| 2005/0191604 A1 | 9/2005 | Allen |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0062624 A1 | 3/2008 | Regen |
| 2008/0084384 A1 | 4/2008 | Gregorio et al. |
| 2008/0111791 A1 | 5/2008 | Nikittin |
| 2008/0297328 A1* | 12/2008 | Crawford ............... A63F 13/285 |
| | | 340/407.2 |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2010/0116629 A1 | 5/2010 | Borissov et al. |
| 2010/0225600 A1 | 9/2010 | Dai et al. |
| 2010/0231508 A1 | 9/2010 | Cruz-Hernandez et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0169347 A1 | 7/2011 | Miyamoto et al. |
| 2011/0205038 A1 | 8/2011 | Drouin et al. |
| 2011/0261021 A1 | 10/2011 | Modarres et al. |
| 2012/0038469 A1 | 2/2012 | Dehmoubed et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0235942 A1 | 9/2012 | Shahoian |
| 2012/0249474 A1* | 10/2012 | Pratt ..................... G06F 3/016 |
| | | 345/174 |
| 2012/0327006 A1 | 12/2012 | Israr et al. |
| 2013/0016042 A1 | 1/2013 | Makinen et al. |
| 2013/0021296 A1 | 1/2013 | Min et al. |
| 2013/0043670 A1 | 2/2013 | Holmes |
| 2013/0044049 A1 | 2/2013 | Biggs et al. |
| 2013/0076635 A1 | 3/2013 | Lin |
| 2013/0154996 A1 | 6/2013 | Trend et al. |
| 2013/0207793 A1 | 8/2013 | Weaber et al. |
| 2014/0125470 A1 | 5/2014 | Rosenberg |
| 2014/0168175 A1 | 6/2014 | Mercea et al. |
| 2015/0084909 A1 | 3/2015 | Worfolk et al. |
| 2015/0126070 A1 | 5/2015 | Candelore |
| 2015/0234493 A1 | 8/2015 | Parivar et al. |
| 2015/0293592 A1 | 10/2015 | Cheong et al. |
| 2016/0098107 A1 | 4/2016 | Morrell et al. |
| 2016/0171767 A1 | 6/2016 | Anderson |
| 2016/0293829 A1 | 10/2016 | Maharjan et al. |
| 2016/0327911 A1* | 11/2016 | Eim ..................... G06F 3/0362 |
| 2016/0328930 A1 | 11/2016 | Weber et al. |
| 2016/0379776 A1 | 12/2016 | Oakley |
| 2017/0024010 A1 | 1/2017 | Weinraub |
| 2017/0090569 A1* | 3/2017 | Levesque ............. G06F 3/016 |
| 2017/0100666 A1* | 4/2017 | Heubel ............... A63F 13/285 |

(56) References Cited

U.S. PATENT DOCUMENTS

| | | |
|---|---|---|
| 2017/0249024 A1 | 8/2017 | Jackson et al. |
| 2017/0269715 A1* | 9/2017 | Kim .................... G10L 15/26 |
| 2017/0336273 A1* | 11/2017 | Elangovan ........... A43B 17/006 |
| 2017/0357325 A1 | 12/2017 | Yang et al. |
| 2018/0005496 A1 | 1/2018 | Dogiamis |
| 2018/0029078 A1 | 2/2018 | Park et al. |
| 2018/0081438 A1 | 3/2018 | Lehmann et al. |
| 2018/0321841 A1 | 11/2018 | Lapp |
| 2018/0335883 A1 | 11/2018 | Choi et al. |
| 2019/0064997 A1 | 2/2019 | Wang et al. |
| 2019/0073079 A1 | 3/2019 | Xu et al. |
| 2019/0278232 A1* | 9/2019 | Ely ........................ G04C 3/04 |
| 2019/0310724 A1 | 10/2019 | Yazdandoost et al. |
| 2020/0004337 A1 | 1/2020 | Hendren et al. |
| 2020/0073477 A1 | 3/2020 | Pandya et al. |

FOREIGN PATENT DOCUMENTS

| | | |
|---|---|---|
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 206339935 | 7/2017 |
| CN | 207115337 | 3/2018 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| KR | 101016208 | 2/2011 |
| KR | 20130137124 | 12/2013 |
| TV | 2010035805 | 10/2010 |
| TV | 201430623 | 8/2014 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2009/156145 | 12/2009 |
| WO | WO2010/129892 | 11/2010 |
| WO | WO2013/169303 | 11/2013 |
| WO | WO2014/066516 | 5/2014 |
| WO | WO2016/091944 | 6/2016 |

OTHER PUBLICATIONS

Author Unknown, "3D Printed Mini Haptic Actuator," Autodesk, Inc., 16 pages, 2016.

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQkS430>, 3 pages.

"Tutorial: Haptic Feedback Using Music and Audio—Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-Box Home, Retrieved from Internet Nov. 12, 2019: https://web.archive.org/web/20180922193345/https://www.d-box.com/en, 4 pages.

U.S. Appl. No. 16/377,197, filed Apr. 6, 2019, Pandya et al.

\* cited by examiner

ELECTRONIC DEVICE WITH AN INPUT DEVICE HAVING A HAPTIC ENGINE

CROSS-REFERENCE TO RELATED APPLICATIONS

This application is a continuation of U.S. Nonprovisional patent application Ser. No. 15/366,674, filed Dec. 1, 2016, and titled "Electronic Device with an Input Device Having a Haptic Engine," which is a nonprovisional patent application of and claims the benefit of U.S. Provisional Patent Application No. 62/334,036, filed May 10, 2016, and titled "Electronic Device with an Input Device Having a Haptic Engine," the disclosures of which are hereby incorporated by reference herein in their entirety.

FIELD

The described embodiments relate generally to electronic devices. More particularly, the present embodiments relate to an electronic device that includes a haptic engine used to detect an input action associated with an input device and provides haptic feedback based on the detected input action.

BACKGROUND

Portable electronic devices have become increasingly popular, and the features and functionality provided by portable electronic devices continue to expand to meet the needs and expectations of many consumers. For example, some portable electronic devices include features such as touch sensors, a display, various input devices, speakers, and microphones. In some cases, the electronic device may take on a small form factor. In such cases, it can be challenging to include all of the components in the electronic device that are needed to provide the various functionalities in the smallest space.

SUMMARY

Embodiments disclosed herein provide an electronic device that is configured to provide haptic feedback to a user based on an input action associated with an input device. A haptic engine is configured to detect an input action associated with the input device (e.g., a translational input) and produce a haptic output based on the detected input action. The haptic output may be perceived by a user as haptic feedback. The haptic feedback can indicate to the user that the user input has been received by the electronic device.

In some embodiments, an input device includes a haptic engine operably connected to or mechanically coupled to an input surface of the input device and to a processing device. The haptic engine may include an electromagnetic actuator, such as a linear actuator, that detects a user input or input action associated with the input surface and provides a haptic output based on the detected input action. The electromagnetic actuator includes a magnet assembly and a coil assembly adjacent to the magnet assembly. For example, the coil assembly can at least partially surround the magnet assembly. The haptic engine detects the input action based on a first movement between the magnet assembly and the coil assembly with respect to each other, the first movement inducing an input device signal in the coil assembly. The processing device is configured to receive or respond to the input device signal and to responsively cause a haptic output signal to be transmitted to the haptic engine. The haptic output signal produces a second movement between the magnet assembly and the coil assembly with respect to each other to produce a haptic output that is applied or transferred to the input surface.

In some embodiments, the input device is an input button in an electronic watch (e.g., a smart watch). The electronic watch also includes a display and a processing device operably connected to the display and to the electromagnetic actuator. An input action (e.g., a translational input action) received by the input button causes the processing device to receive or respond to an input device signal from the electromagnetic actuator and a haptic output signal to be transmitted to the electromagnetic actuator. The display is configured to display a user interface screen associated with an application program, and the input action also causes a change in the user interface screen displayed on the display. For example, an icon may be selected and a different user interface screen displayed based on the selected icon, or the digits in the time displayed on the display are changed based on the input action.

In some embodiments, an electronic device includes an input device configured to receive a user input, a haptic device operably connected to the input device, and a processing device operably connected to the haptic device. The processing device is configured to receive or respond to an input device signal from the haptic device based on the user input. In response to the input device signal, the processing device is configured to cause a haptic output signal to be transmitted to the haptic device. The haptic output signal causes the haptic device to produce a haptic output.

In some embodiments, an electronic device includes an input device configured to receive a user input and a haptic engine operably connected to the input device. The haptic engine is configured to detect the user input and produce a haptic output based on the detected user input. The haptic engine is further configured to operate in a first mode in which the haptic engine engages the input device, and in a second mode in which the haptic engine is not engaged with the input device.

In some embodiments, an electronic watch includes an electromagnetic actuator operably connected to an input button, and a processing device operably connected to the electromagnetic actuator. The electromagnetic actuator includes a magnet assembly and a coil assembly adjacent the magnet assembly. The electromagnetic actuator is configured to detect an input action (e.g., a translational input action) provided to the input button based on a first movement between the magnet assembly and the coil assembly. The first movement induces an input device signal in the coil assembly. The processing device is configured to receive or respond to the input device signal and to cause a haptic output signal to be transmitted to the electromagnetic actuator to cause a second movement between the magnet assembly and the coil assembly to produce a haptic output. The haptic output may be applied to the input button and/or to another region or surface of the electronic device.

In some embodiments, an electronic watch includes a linear actuator operably connected to a crown and a processing device operably connected to the linear actuator. The linear actuator includes a magnet assembly movably coupled to a shaft and a coil assembly adjacent the magnet assembly. The linear actuator is configured to detect an input action (e.g., a translational input action) provided to the crown based on a first movement between the magnet assembly and the coil assembly, the first movement inducing an input device signal. The processing device is configured to receive or respond to the input device signal and to cause a haptic output signal to be transmitted to the linear actuator. The haptic output signal causes a second movement between the magnet assembly and the coil assembly to produce a haptic output. The haptic output may be applied to the crown and/or to another region or surface of the electronic device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
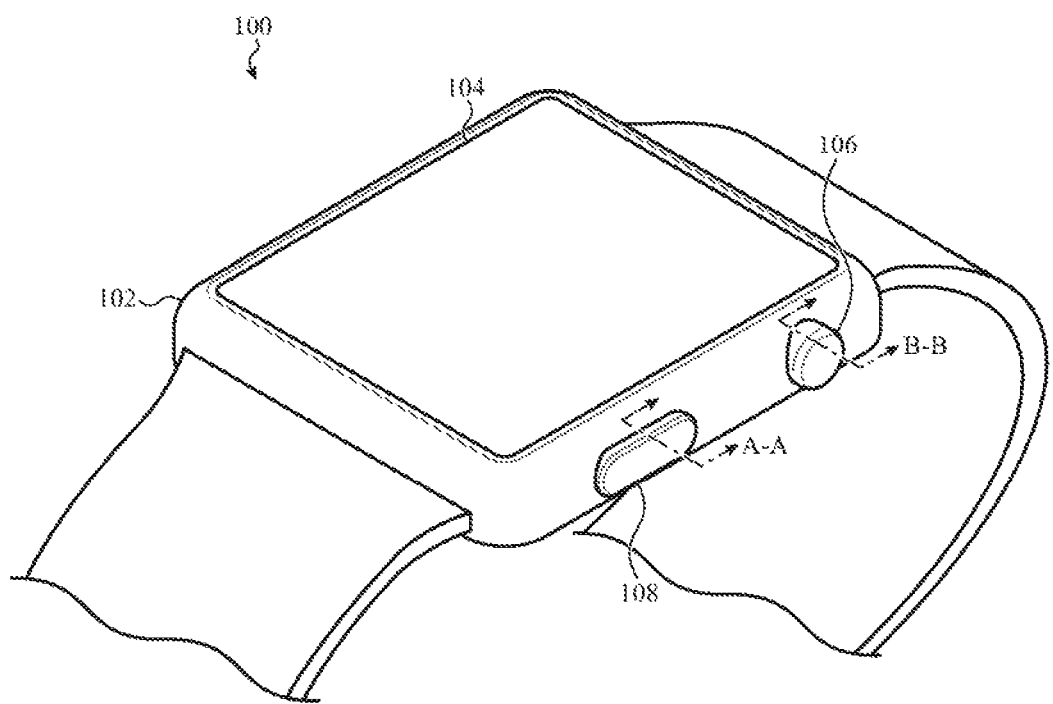
FIG. 1 shows one example of an electronic device that can include a haptic engine configured to provide haptic output based on an input action associated with an input device.

The cross-hatching in the figures is provided to distinguish the elements or components from one another. The cross-hatching is not intended to indicate a type of material or materials or the nature of the material(s).

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device that is configured to provide haptic feedback to a user. In general, a haptic device may be configured to produce a mechanical movement or vibration that may be transmitted through the enclosure and/or an input device of the electronic device. In some cases, the movement or vibration is transmitted to the skin of the user and perceived as a stimulus or haptic feedback by the user. In some embodiments, the haptic feedback may be coupled to an input action on an input device. One example of an input action is the pressing of an input button. The haptic feedback can indicate to a user that the input action has been received or registered by the input device and/or the electronic device.

In a particular embodiment, the electronic device includes an input device and a haptic engine operably connected to the input device. A haptic engine may include an electromechanical assembly that is capable of producing a change in momentum using a moving mass that results in a haptic output. In the embodiments described herein, the haptic engine is configured to function as both an input sensor and a haptic device. In particular, the input sensor may be integrated within the haptic device in that the electromechanical components that produce and receive signals from both the haptic device and the input sensor. For example, when the haptic device is an electromagnetic actuator, an input action (e.g., button press) can cause the magnet assembly and the coil assembly to move with respect to each other. This movement induces a current (or "input device signal") in the coil assembly. The input device signal indicates an input action associated with the input device has occurred. A processing device may be responsive to the input device signal, and may cause a haptic output signal to be transmitted to the coil assembly. The haptic output signal may cause the haptic device to produce a haptic output.

As used herein, the term "input action" may be construed broadly to include any type of user input associated with an input device, or with one or more components in an input device. Example input actions include, but are not limited to, a translational input, touch input, force input, motion input, acceleration input, pressure input, velocity input, rotational input, and combinations thereof. In a non-limiting example, an input device can be an input button in an electronic device, and one input action associated with the input button is a button press or translational input. The button press may cause the input button, or components within the input button, to translate or move in the same direction as the direction of the button press (e.g., horizontal direction).

Additionally or alternatively, an input action can include a force input where an amount of force, or varying amounts of force, is applied to an input device. In such embodiments, a processing device operably connected to the haptic engine is configured to detect the applied force on the input device. Additionally or alternatively, the processing device can be configured to detect motion or a rotation of the input device (or of a component in the input device). In a non-limiting example, the input device may be a crown of an electronic watch (e.g., a smart watch) that a user can rotate to provide one or more inputs to the smart watch.

In general, a haptic engine may produce one or more types of haptic output, such as vibrations, an applied force, movement, and combinations thereof. The haptic output may be transmitted through the enclosure and/or an input device of the electronic device and detected by a user. In some cases, the movement, force, and/or vibration is transmitted to the skin of the user and perceived as a stimulus or haptic feedback by the user. In one non-limiting example, a user can press an input button and the haptic engine can apply a force to the input button in a direction opposite the direction of the button press. The applied force may be perceived by the user as a "tap" or "knock" that indicates the input device and/or the electronic device registered the button press. Alternatively, the haptic engine may move a mass in one direction or in opposing directions in response to the button press. The movement may be perceived by the user as a vibration that indicates the input device and/or the electronic device registered the button press.

In some embodiments, the position of the haptic engine can be adjusted so that a haptic output can be applied to different regions of an electronic device. For example, a haptic engine may be positioned at a first position to apply a haptic output directly to an input device (e.g., an exterior surface of an input button). The haptic engine may also be positioned at a second position to apply a haptic output to a different region of the electronic device (e.g., an exterior surface of an enclosure). The position of the haptic engine can be adjusted using any suitable method. For example, in one embodiment an electromagnet or switch may position the haptic device.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with the components of an input device and of an electronic device, the directional terminology is intended to be construed broadly, and therefore should not be interpreted to preclude the presence of one or more intervening components or other intervening features or elements.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 shows one example of an electronic device that can include a haptic engine configured to produce haptic output based on an input action associated with an input device. In the illustrated embodiment, the electronic device 100 may be implemented as an electronic or smart watch that is adapted to be worn by a user. A different type of electronic device can be used in other embodiments. For example, the electronic device can be a gaming device, a digital music player, a sports accessory device, a medical device, a health assistant, a tablet computing device, a notebook computer, a smart phone, and other types of electronic devices that provide, or are suitable to provide, haptic feedback to a user.

The electronic device 100 includes input devices 106, 108. In some embodiments, one or both of the input devices 106, 108 may be configured as input/output devices. The term "input device" is intended to be construed broadly to include both input and input/output devices. An input device may include an input component, such as a button, knob, dial, crown, and the like. Although shown on a side of the electronic device 100, the input devices 106, 108 can be positioned substantially anywhere on the electronic device 100.

As will be described in more detail later, the electronic device 100 includes at least one haptic engine (see e.g., FIG. 2) operably connected to one or both input devices. The haptic engine is configured to detect an input action associated with one or both input devices 106, 108 and provide haptic feedback to a user when an input action is detected. The haptic engine functions as both an input sensor and a haptic device. In some embodiments, at least some of the components of the haptic engine can be used as the input sensor. For example, when the haptic engine is an electromagnetic actuator (e.g., a linear actuator), an input action (e.g., a translation of input device 108) can cause a magnet assembly and a coil assembly of the electromagnetic actuator to move with respect to each other. This movement induces a current (or "input device signal") in the coil assembly. The input device signal may indicate that an input action associated with the input device has occurred. A processing device may be responsive to the input device signal and may, in turn, cause a haptic output signal to be transmitted to the coil assembly. The haptic output signal causes the electromagnetic actuator to produce a haptic output. The haptic output may be perceived by the user as haptic feedback that indicates the input action has been registered or entered by the electronic device 100 and/or the input device(s) 106, 108.

In the illustrated embodiment, the input device 106 is a crown and the input device 108 an input button. Input devices in other embodiments are not limited to these configurations. For example, an input device may be a rocker switch, a portion of the enclosure 102, one or more keys in a keyboard, a slide switch, a virtual icon or image on a display, or any other suitable input device.

The input device 106 (e.g., crown) is configured to receive translational and rotational input actions. For example, the input device 106 may include a shaft that extends into the electronic device 100. Pressing the input device 106 can cause the shaft, or components coupled to the shaft, to move or translate a given distance. Additionally or alternatively, the shaft may rotate when a user rotates the input device 106. The amount of shaft rotation can be detected and measured by an optical encoder positioned adjacent to the shaft. The amount of shaft rotation may be used as an input to the electronic device 100 and/or to an application program running on the electronic device 100.

One or more functions can be performed when the input device 106 is rotated and/or pressed. For example, if the display 104 of the electronic device 100 is displaying a time keeping application, the input device 106 may be rotated in either direction to change or adjust the position of the hands or the digits that are displayed for the time keeping application. Additionally or alternatively, the input device 106 may be rotated to move a cursor or other type of selection mechanism from a first displayed location to a second displayed location in order to select an icon or move the selection mechanism between various icons that are presented on the display 104. Additionally or alternatively, the input device 106 may be pressed to perform various functions, such as changing the image on a display, waking the electronic device 100 from a sleep state, and/or to select or activate an application. In some embodiments, the input device 106 can be rotated or pressed to disable an application or function. For example, the input device 106 may be pressed to disable an alert produced by an application on the electronic device 100 or received by the electronic device 100.

In some embodiments, the input device 108 (e.g., an input component or input button) can be configured to be pressed to cause various functions to be performed and/or disabled. The input device 108 may include a shaft that extends into the electronic device 100. Pressing the input device 108 can cause the shaft, or components coupled to the shaft, to move or translate a given distance. For example, a single press can activate an application and/or display a particular image or screen on the display. Additionally or alternatively, a single press may disable or delay an alert. A multiple press (e.g., a double press or double click) can activate an application and a component within the electronic device 100. For example, a double click may access an application that uses a wireless communication network to transmit data associated with the application (e.g., an electronic payment application). Additionally or alternatively, a press-hold may operate to turn on and turn off the electronic device 100 or to place the electronic device 100 in a power saving mode (e.g., a mode where minimal functions and applications operate and other applications and functions are disabled).

In some embodiments, pressing both of the input devices 106, 108 in various combinations can cause one or more functions to be performed. For example, pressing the input device 106 and then immediately pressing the input device 108 can cause an action to be performed on the electronic device 100. Additionally or alternatively, simultaneous press-holds on the input devices 106, 108 can cause another action to be performed on the electronic device 100.

The electronic device 100 further includes an enclosure 102 that forms an outer surface or partial outer surface for the internal components of the electronic device 100. The enclosure 102 defines openings and/or apertures that receive and/or support a display 104 and the input devices 106, 108. The enclosure 102 can be formed of one or more components operably connected together, such as a front piece and a back piece. Alternatively, the enclosure 102 can be formed of a single piece operably connected to the display 104. In the illustrated embodiment, the enclosure 102 is formed into a substantially rectangular shape, although this configuration is not required. For example, certain embodiments may include a substantially circular enclosure 102.

The display 104 can provide a visual output for the electronic device 100 and/or function to receive user inputs to the electronic device 100. For example, the display 104 may incorporate an input device configured to receive touch input, force input, temperature input, and the like. The display 104 may be substantially any size and may be positioned substantially anywhere on the electronic device 100. The display 104 can be implemented with any suitable display, including, but not limited to, a multi-touch sensing touchscreen device that uses liquid crystal display (LCD) element, a light emitting diode (LED) element, an organic light-emitting display (OLED) element, or an organic electro luminescence (OEL) element.

Figure 2:
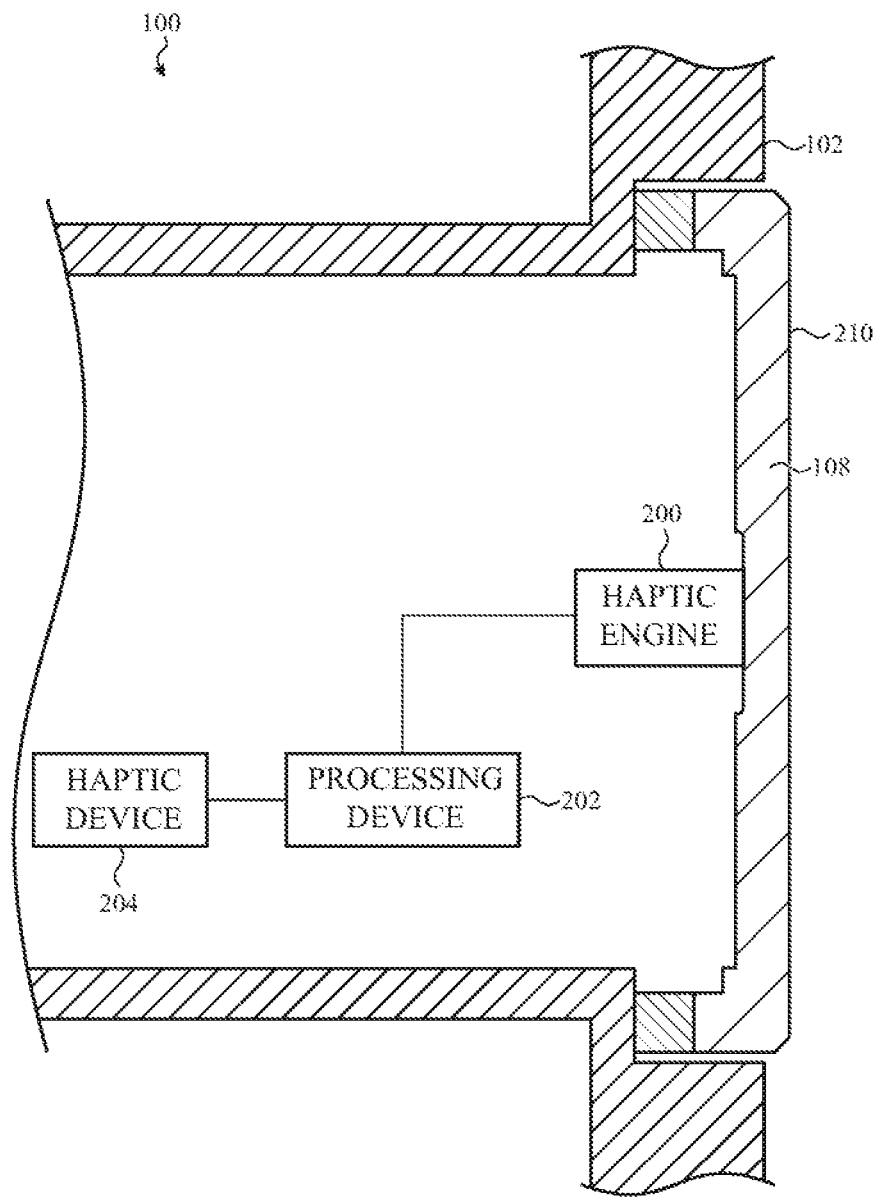
FIG. 2 depicts a simplified schematic of the electronic device taken along line A-A in FIG. 1.

FIG. 2 shows a simplified schematic of the electronic device taken along line A-A in FIG. 1. The electronic device 100 can include a haptic engine 200 operably connected to a processing device 202. The haptic engine 200 is configured to detect an input action associated with the input device 108 and produce a haptic output based on a detected input action. As used herein, the input device 108 may also be referred to as an input component, which may include an input button, push button, or actuator. As described earlier, the haptic engine 200 may produce one or more types of haptic output, such as vibrations, an applied force, movement, and combinations thereof. The haptic output may be applied or transferred to at least one surface of the electronic device 100 and/or to the input device 108. For example, the haptic output can be transmitted through the input device and/or the enclosure and perceived as haptic feedback by a user.

For example, in one embodiment the haptic engine 200 is configured to apply a haptic output to a bottom surface of the enclosure 102 (e.g., the momentum of the haptic output can be transferred to the bottom surface). When a user is wearing the electronic device 100 on his or her wrist, the haptic output may be detected by the user as haptic feedback because the bottom surface of the electronic device 100 is in contact with the wrist. In other embodiments, the haptic output may be applied or transferred to a side of the electronic device 100, a top surface of the electronic device 100, multiple surfaces of the electronic device 100, and combinations thereof.

Additionally or alternatively, the haptic engine 200 may be configured to produce a haptic output that is applied or transferred to the input device 108. The haptic engine 200 may be mechanically or structurally coupled to the input surface 210 (of the input device 108) to receive movement from and/or transmit movement to the input surface 210. By mechanically coupling the haptic engine 200 to the input surface 210, movement of the input surface 210 results in movement of one or more components of the haptic engine 200. In one non-limiting example, when a user applies a force to the input surface 210 of the input device 108 (e.g., presses the input surface 210), the haptic engine 200 can detect such input action and produce a first signal ("input device signal") that is received by the processing device 202. Based on the input device signal, the processing device 202 can cause a second signal ("haptic output signal") to be transmitted to the haptic engine 200 that causes the haptic engine 200 to produce a haptic output (e.g., a vibration or an applied force). A user may then detect the haptic output as haptic feedback when the user's finger is in contact with the input surface 210.

In some embodiments, the haptic engine 200 can be configured to operate in two or more modes. For example, in a first mode, the haptic engine 200 may be positioned at a first position to apply a haptic output directly to the interior surface of an input device (e.g., input device 108). In a second mode, the haptic engine 200 can be positioned at a second position to produce a haptic output within the electronic device 100 and/or to apply to one or more non-input-device surfaces or regions of the electronic device 100.

Additionally or alternatively, a second haptic device 204 may be operably connected to the processing device 202. In such embodiments, the haptic engine 200 can produce a haptic output for the input device 108 while the second haptic device 204 may produce a haptic output for one or more different surfaces (non-input-device surfaces) or regions of the electronic device 100.

Any suitable type of haptic device can be used in the haptic engine 200 and/or the second haptic device 204. Example haptic devices include, but are not limited to, actuators, vibrator, and other type of motors. As described earlier, a haptic device and haptic engine may produce one or more types of haptic output, such as movement, vibrations, transfer of momentum, and other actions that may produce a perceptible or tactile output.

In some embodiments, an input sensor and a haptic device are separate components within the electronic device 100. In such embodiments, the input sensor can detect or sense an input action using any suitable sensing technology, such as capacitive, piezoelectric, piezoresistive, electromagnetic, ultrasonic, and magnetic sensing technologies. For example, in one embodiment a capacitive input sensor can be used to detect the presence of a user's finger on the input device. Additionally or alternatively, a capacitive sensor may be used to detect a user applying a force on the input device. For example, when the input device is an input button, the input sensor can detect the presence of a user's finger on the button and/or the user pressing the input button.

Figure 3:
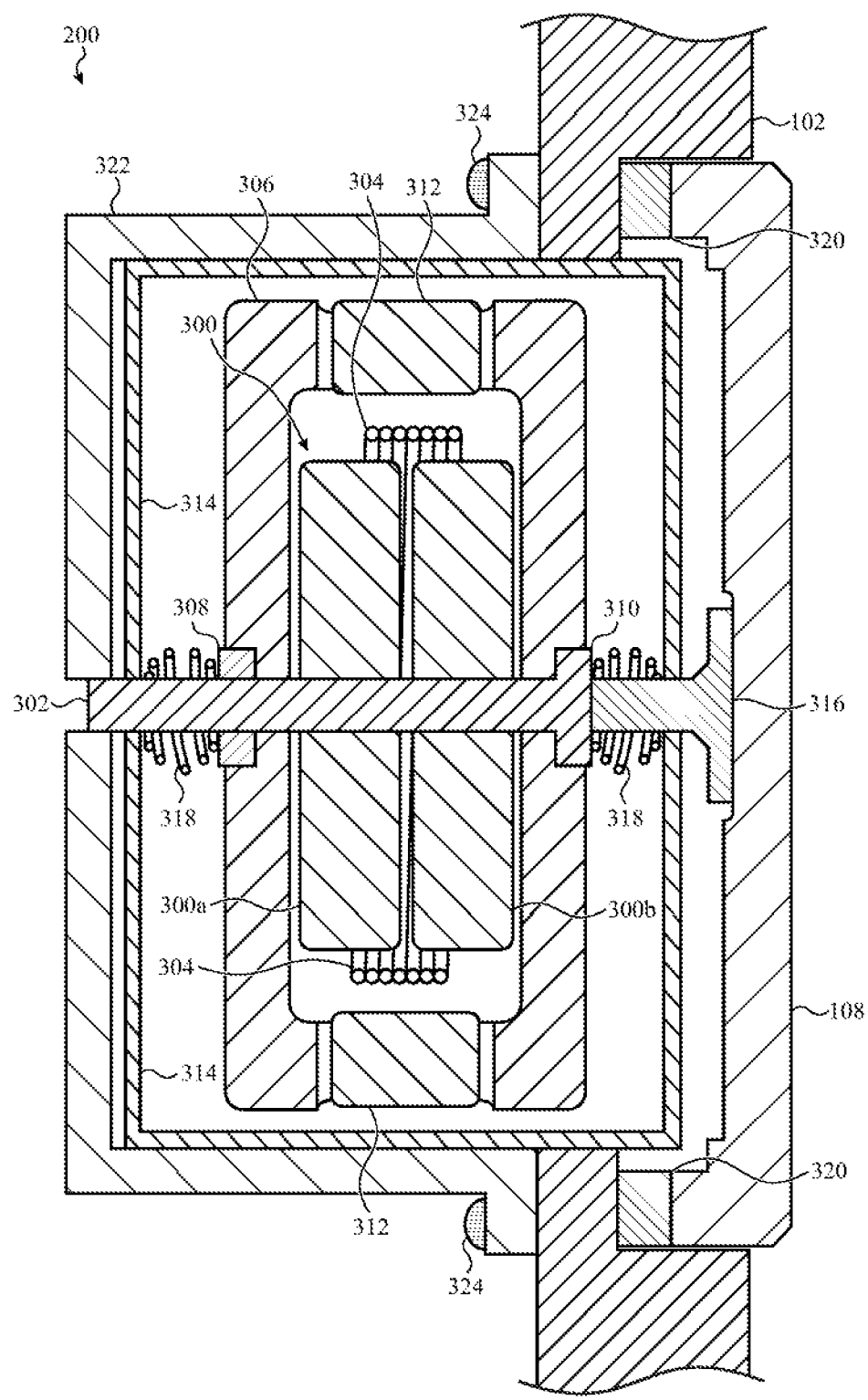
FIG. 3 shows a schematic cross-sectional view of a first example of the electronic device taken along line A-A in FIG. 1.

Example embodiments of a haptic engine will now be discussed. FIG. 3 shows a schematic cross-sectional view of a first example of the electronic device taken along line A-A in FIG. 1. In the illustrated embodiment, the haptic engine 200 is mechanically coupled to the input device 108. In some examples, a mechanical coupling between the haptic engine 200 and the input device 108 facilitates a transfer of motion between the two components. In particular, the haptic engine 200 may be mechanically coupled to the input device 108 such that a translational input to the input device 108 is transferred or structurally communicated to the haptic engine 200. Additionally, translational (e.g., vibrational) output from the haptic engine 200 may be transferred or mechanically communicated to the input device 108.

In the example of FIG. 3, the haptic engine 200 includes an electromagnetic actuator or linear actuator that uses a moving mass to create a haptic output (e.g., movement, applied force, and/or vibration). In one non-limiting example, the moving mass may be one or more magnets that move(s) in one direction or in an oscillating manner in response to a current passing through a coil that is adjacent to the magnet(s). The moving magnet(s) can produce a vibration or applied force that is perceived as haptic feedback by a user.

In the illustrated embodiment, the haptic engine 200 includes a magnet assembly 300 coupled to and/or movably positioned about a shaft 302. The magnet assembly 300 can include one or more magnets. In the illustrated embodiment, the magnet assembly 300 includes two magnets 300a, 300b of opposite polarities. The magnets 300a, 300b can be made of any suitable ferromagnetic material, such as neodymium. The shaft 302 may be formed form one or more components that are fixed with respect to each other or may be separated to allow for decoupling of the haptic engine 200 from other elements of the device. The shaft 302 can be made of a non-ferrous material such as tungsten, titanium, stainless steel, or the like.

A coil assembly 304 at least partially surrounds the magnet assembly 300 and/or the shaft 302. The coil assembly 304 includes one or more coils. Each coil can be formed with a winding of a conductive material, such as a metal. In one embodiment, the width of the coil assembly 304 can be less than or substantially equal to the width of the magnet assembly 300. In other embodiments, the width of the coil assembly 304 may be greater than the width of the magnet assembly 300.

In some embodiments, a frame 306 can be positioned at least partially around the coil assembly 304, the magnet assembly 300, and/or the shaft 302 to increase the momentum of the linear actuator. The frame 306 can be made of any suitable material. In one embodiment, the frame 306 is made of a metal, such as tungsten.

The coil assembly 304 and the magnet assembly 300 are positioned such that a first air gap separates the coil assembly 304 from the magnet assembly 300. Similarly, the coil assembly 304 and the frame 306 are positioned such that a second air gap separates the coil assembly 304 from the frame 306. In the illustrated embodiment, the first and second air gaps are located on opposing sides of the coil assembly 304.

In some embodiments, the frame 306 can be disengaged from the input device 108. The shaft 302 extends through a bearing 308 and a collar 310 which support the frame 306. The collar 310 allows the shaft 302 to pass one frame 306 in only one direction. For example, the collar 310 may permit the shaft 302 to only move in a direction away from the input device 108.

The coil assembly 304 may be energized by transmitting a current along a length of a wire that forms a coil in the coil assembly 304. A direction of the current along the wire of the coil determines a direction of a magnetic field that emanates from the coil assembly 304. The opposing polarities of the magnets 300a, 300b generate a radial magnetic field that interacts with the magnetic field of the coil assembly 304. The Lorentz force resulting from the interaction of the magnetic fields causes the frame 306 and the magnet assembly 300 to move in a first direction aligned with the axis of the shaft 302. Reversing the current flow through the coil assembly 304 reverses the Lorentz force. As a result, the magnetic field or force on the magnet assembly 300 is also reversed and the frame 306 and the magnet assembly 300 move in an opposing second direction. Thus, the frame 306 and the magnet assembly 300 can move in one direction or in an oscillating manner depending on the direction of the current flow through the coil assembly 304. In some embodiments, the frame 306 includes one or more magnets 312 that assist in moving the frame 306 and produce increased momentum when a current passes through the coil assembly 304.

When a user provides an input action to the input button 108 (e.g., a button press), the shaft 302, the magnet assembly 300, and the frame 306 can move a given distance into the electronic device 100. This movement induces a current ("input device signal") in the coil assembly 304. A processing device (e.g., processing device 202 in FIG. 2) can receive or be responsive to the input device signal and cause a haptic output signal to be transmitted to the coil assembly 304. A haptic output is produced by the magnet assembly 300 and the frame 306 moving in one direction or in an oscillating manner based on the haptic output signal passing through the coil assembly 304.

A housing 314 may be attached to the enclosure 102 and positioned at least partially around the frame 306, the magnet assembly 300, the coil assembly 304, and the shaft 302. In the illustrated embodiment, the shaft 302 extends through the housing 314 with a contact area 316 attached to the interior surface of the input device 108. The momentum of a haptic output can be transferred to the input device 108 using the contact area 316.

A bracket 322 can at least partially surround the housing 314 and attach to an interior surface of the enclosure 102 using one or more fasteners 324. The bracket 322 fixes the housing 314 to the enclosure 102. Any suitable fastener may be used, such as screws, welding, and/or an adhesive. In some embodiments, the shaft 302 can extend into and/or pass through an opening in the bracket 322. This allows the shaft 302 to move in or through the opening when a force is applied to the input device 108.

In the example embodiment, the coil assembly 304 is fixed to the housing 314. The frame 306 and the magnet assembly 300 move with respect to the coil assembly 304. In such embodiments, the coil assembly 304 may not contact any portion of the frame 306 even when the frame 306 and the magnet assembly 300 are maximally displaced within the housing 314 (e.g., to one end of the shaft 302). It should be appreciated that in other embodiments the coil assembly 304 may move instead of, or in addition to, the frame 306 and the magnet assembly 300. However, it may be easier to provide the interconnections for the coil assembly 304 when the coil assembly 304 is fixed to the housing 314. For example, the coil assembly 304 can be electrically connected to a power source using a flexible circuit or other signal line.

A compliant element 318 can be positioned on each side of the frame 306 to bias the frame 306 towards the center region of the travel. The compliant elements 318 provide a return force or local biasing to the frame 306. The compliant elements 318 may be any suitable compliant element such as a leaf spring, beehive spring, and the like.

In some embodiments, the haptic engine 200 can function as a force sensor. Using the known characteristics of the input device signal and the linear actuator, such as the mass of the magnet assembly 300 and the spring coefficients of the compliant elements 318, the acceleration of the movement of the input device 108 can be correlated to an amount of force.

A compliant structure 320 can be positioned between the input device 108 and the enclosure 102 to allow travel between the input device 108 and the enclosure 102 and to return the input device 108 to a resting position. In one embodiment, the compliant structure 320 is positioned around an interior perimeter of the input device 108. In other embodiments, one or more discrete compliant structures 320 may be positioned around an interior perimeter of the input device 108.

As discussed earlier, in some embodiments at least some of the components of the haptic engine 200 are shared and form both an input sensor and a haptic device. In the illustrated embodiment, the magnet assembly 300 and the coil assembly 304 can be used as an input sensor. When a user performs an input action on the input device 108 (e.g., by pressing), the shaft 302, the magnet assembly 300, and the frame 306 can move inward, which in turn induces a current ("input device signal") in the coil assembly 304. A processing device (not shown) operably connected to the coil assembly 304 may receive or be responsive to the input device signal and cause a haptic output signal to be transmitted to the coil assembly 304. The haptic output signal is transmitted along the length of a wire in a coil in the coil assembly 304, which in turn produces a magnetic field that causes the frame 306 and the magnets 300a, 300b to move and produce a haptic output (an applied force, movement, and/or vibration). The movement, vibration, and/or applied force may be perceived by a user as haptic feedback. Thus, the input action is sensed through the movement of the frame 306 and the magnets 300a, 300b with respect to the coil assembly 304, and a haptic output is produced by the movement of the frame 306 and the magnets 300a, 300b with respect to the coil assembly 304.

Additionally or alternatively, a discrete input sensor can be included in the electronic device. For example, in one embodiment, the compliant structure 320 can be formed as a force sensing layer configured to detect an amount of force applied to the input device 108. In one example, the force sensing layer can include two electrode layers separated by a dielectric or compliant material (e.g., air, foam, silicon, and the like). Each electrode layer can include one or more electrodes that are aligned in at least one direction to produce one or more capacitors. When a force is applied to the input device 108 (e.g., when a user presses the input device 108), the distance between the electrodes in at least one capacitor changes, which changes a capacitance of the capacitor. A processing device (not shown) can receive or be responsive to a signal from each capacitor representing the capacitance of that capacitor. The processing device may be configured to correlate the signal(s) to an amount of force that was applied to the input device 108.

The force sensing layer provides for a range of force input values that can be used to control a variety of functions. For example, a user can press the input device with a first force to perform a scrolling action at a first speed and press the input device with a second force to perform a scrolling action at a different second speed (e.g., a faster speed).

In some embodiments, a different type of input sensor can be used. The input sensor can be configured to detect any suitable characteristic or property. For example, the input sensor may be an image sensor, a light or optical sensor, a proximity sensor, a magnet, a biometric sensor, a touch sensor, an accelerometer, and so on. In an example embodiment, the input sensor can include one or more strain gauges, a tactile or reed switch, or a capacitive touch sensor. For example, the capacitive touch sensor may include a first electrode disposed within the enclosure 102 adjacent the input device 108 and a second electrode attached to or embedded in the input device 108.

Figure 4:
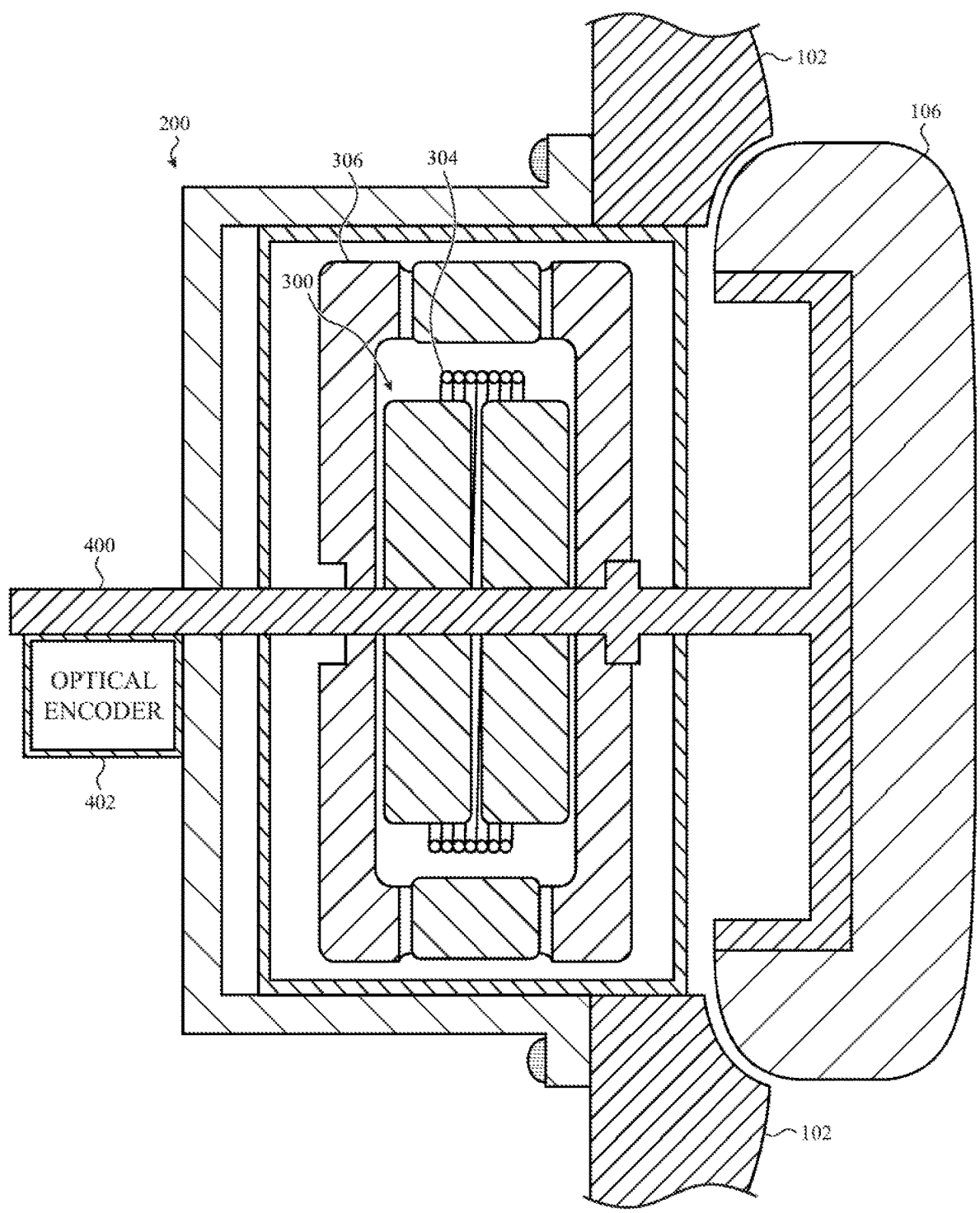
FIG. 4 depicts a simplified cross-sectional view of a second example of the electronic device taken along line B-B in FIG. 1.

FIG. 4 depicts a simplified cross-sectional view of a second example of the electronic device taken along line B-B in FIG. 1. Similar to the previous examples, the electronic device includes a haptic engine 200, the description of which is provided above with respect to FIG. 3.

With respect to the example of FIG. 4, the input device 106, in this case a crown, is configured to receive both translational and rotational input actions from a user. An optical encoder 402 can be used to determine an amount of rotation for a rotational input. The optical encoder 402 can convert the angular motion of the shaft 400 to an analog or digital code. Typically, the shaft 400 includes a pattern (not shown) formed in or on the shaft 400 that selectively reflects light toward an optical sensor (not shown). The reflected light is used to determine the amount of rotation.

As shown in FIG. 4, the input device 106 is operably coupled to the haptic engine 200. As describe above with respect to FIG. 3, the haptic engine includes a magnet assembly 300 coupled to a frame 306, which is coupled to a shaft 400. The shaft 400 may be formed form one or more components that are fixed with respect to each other or may be separated to allow for decoupling of the haptic engine 200 from other elements of the device. A coil 304 is positioned adjacent to the magnet assembly 300 and is configured to produce a current in response to a movement of the magnet assembly 300. The coil 304 may also induce movement of the magnet assembly 300 when driven by a current or electrical signal.

In the example of FIG. 4, the haptic engine 200 is mechanically or structurally coupled to the input device 106 such that motion of the input device 106 may be mechanically transferred to the haptic engine 200 and, similarly, motion produced by the haptic engine 200 may be mechanically transferred to the input device 106. In this example, the haptic engine 200 is configured to detect a translational input action (e.g., a press) associated with the input device 106 and produce a haptic output based on a detected input action. The haptic output may be applied to an exterior surface of the input device 106 (e.g., crown) and/or to another region or exterior surface of the electronic device.

Additionally, in some embodiments the haptic engine 200 provides a haptic output based on a rotational input action. The optical encoder 402 may produce an input device signal when the input device 106 is rotated. The processing unit may receive or be responsive to the input device signal and, in turn, cause a haptic output signal to be transmitted to the haptic engine 200. The haptic output signal may cause the haptic engine 200 to produce a haptic output that can be perceived by a user as haptic feedback indicating the rotational input action has been received by the electronic device.

It should be noted that the positions of the haptic engine 200 and the optical encoder 402 shown in FIG. 4 are for illustration purposes only. For example, the optical encoder 402 may be situated at any location adjacent the shaft 400 to allow the optical encoder 402 to emit light toward the shaft 400 and receive the light reflected by the shaft 400.

Figure 5:
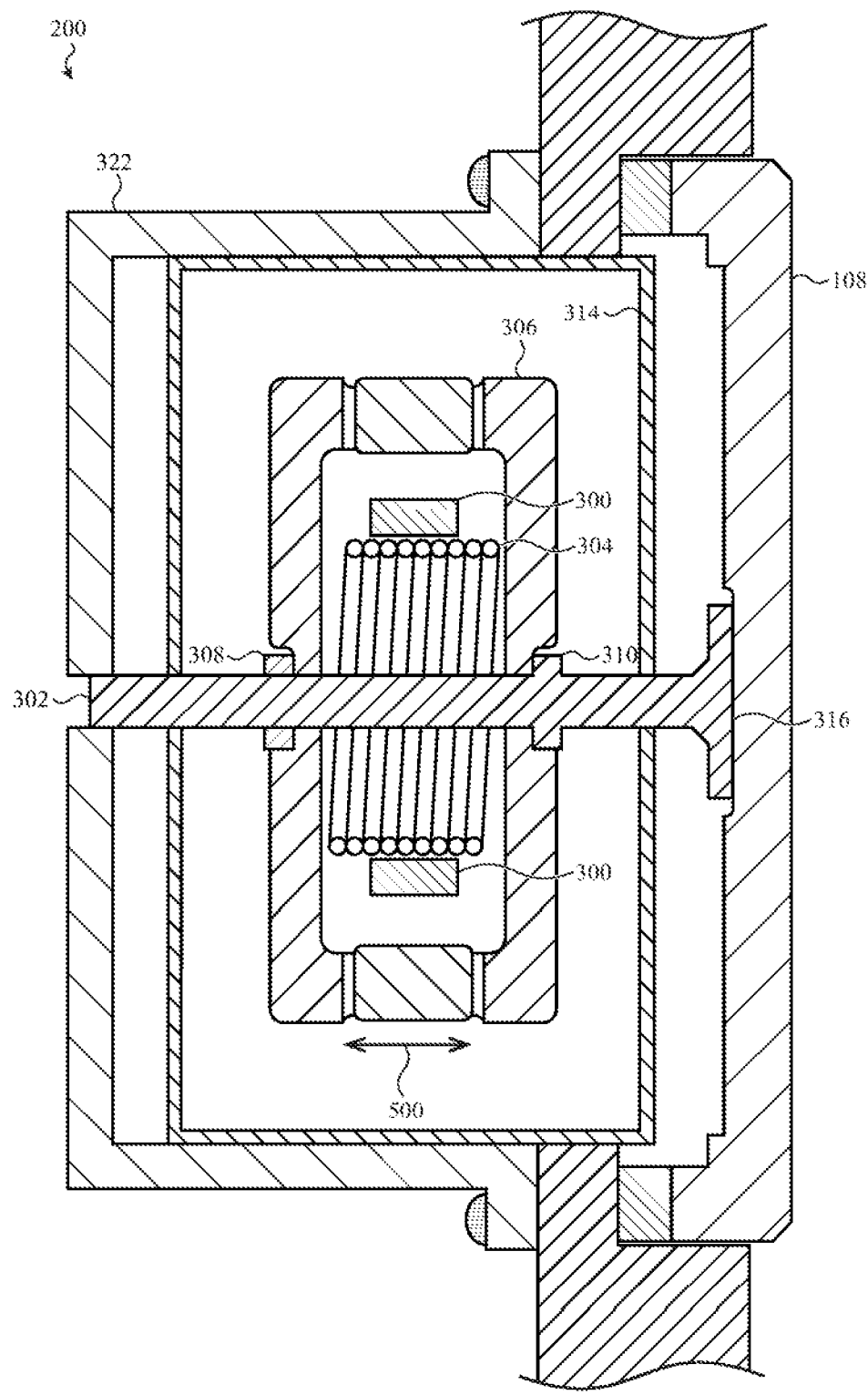
FIG. 5 shows show a simplified cross-sectional view of a third example of the electronic device taken along line A-A in FIG. 1.

FIG. 5 shows a simplified cross-sectional view of a third example of the electronic device taken along line A-A in FIG. 1. Similar to the previous examples, the haptic engine 200 is mechanically or structurally coupled to the input device 108. In the illustrated embodiment, the coil assembly 304 is movably coupled or positioned about the shaft 302 and the magnet assembly 300 is attached to the housing 314. A current can be applied to the coil assembly 304 to move the frame 306 and the coil assembly 304 in one direction or in an oscillating manner (as represented by arrow 500) to produce a haptic output within the enclosure 102. The haptic output may be applied directly to the input device 108 through the contact area 316 of the shaft 302. For example, a vibrational haptic output produced by the moving magnet assembly 300 and the frame 306 can be transferred through the contact area 316 to the input device 108.

As discussed earlier, a haptic engine can be configured to operate in two or more modes. For example, in a first mode, the haptic engine may be positioned at a first position to apply a haptic output directly to the interior surface of an input device (e.g., input device 108). In a second mode, the haptic engine can be positioned at a second position to produce a haptic output within the electronic device and/or to apply a haptic output to one or more non-input-device surfaces or regions of the electronic device. FIGS. 6A-7B illustrate two embodiments where the haptic engine operates in two modes.

Figure 6A:
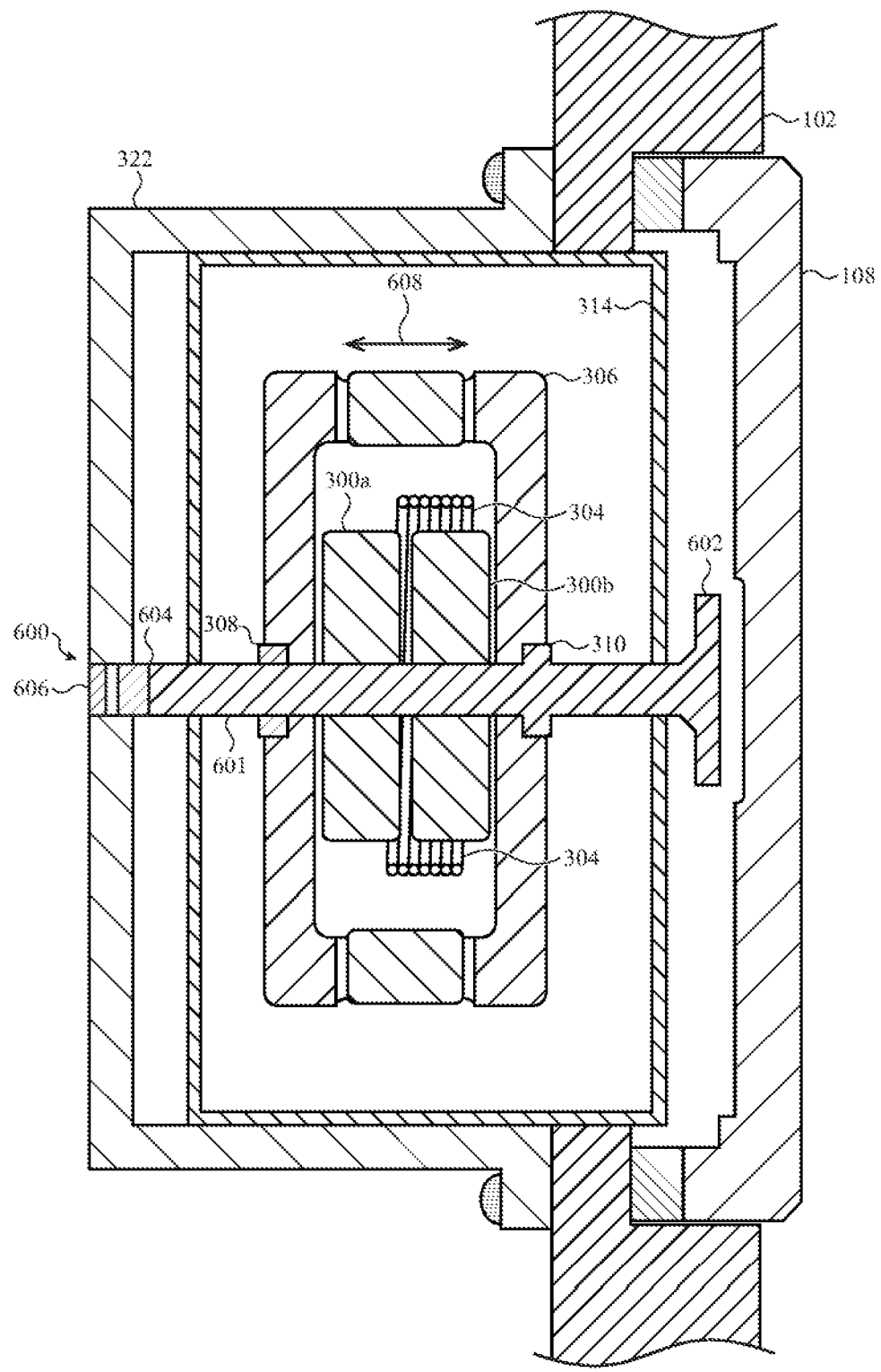
FIGS. 6A-6B show a simplified cross-sectional view of a fourth example of the electronic device taken along line A-A in FIG. 1.
Figure 6B:
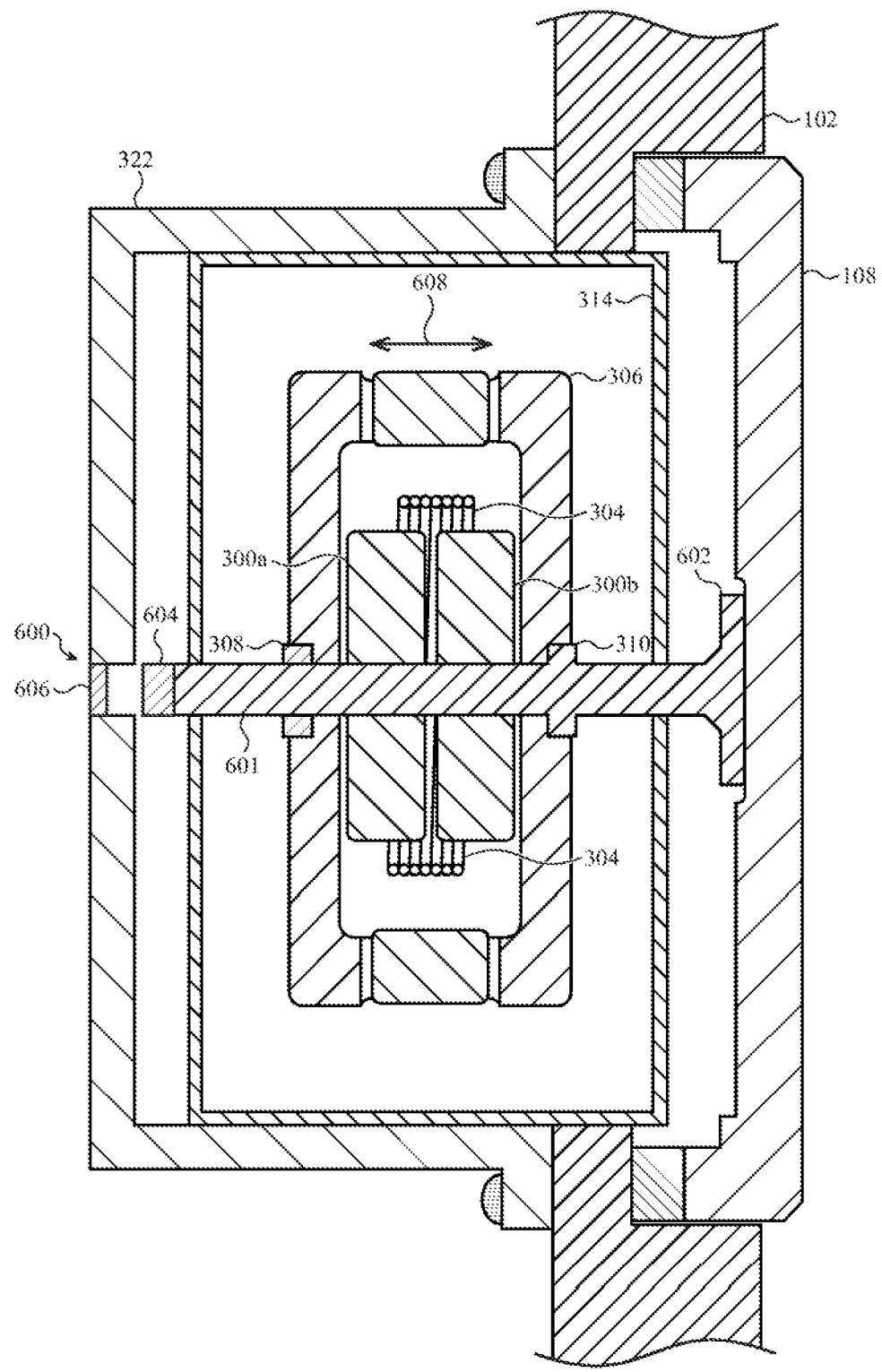

FIGS. 6A-6B depict a simplified cross-sectional view of a fourth example of the electronic device taken along line A-A in FIG. 1. In the illustrated embodiment, the haptic engine can be positioned in two different positions. In this example, the shaft 600 includes a body 601 and a contact area 602. The body 601 and the contact area 602 may be fixed to each other or may be configured to separate to decouple the haptic engine from the input device 108. The position of the body 601 and the contact area 602 are adjustable via a biasing mechanism. Any suitable biasing mechanism can be used. For example, in one embodiment the biasing mechanism includes a magnet 604 attached to, or embedded in, the end of the shaft 600 that is opposite the contact area 602. An electromagnet 606 can be positioned within the enclosure 102 a given distance from the magnet 604. A current can be received by the electromagnet 606 that produces an attracting or repelling magnetic field with respect to the magnet 604, depending on whether the contact area 602 is to be moved away from or toward the interior surface of the input device 108. In some embodiments, the shaft 600 can be situated in one of three or more positions using the electromagnet 606 and the magnet 604.

Other embodiments can use different types of biasing mechanisms. For example, one or more magnets and electromagnets can be included in, or attached to, the contact area 602 and the input device 108, respectively. Alternatively, one or more electromagnets may be included in, or attached to, the input device 108. The electromagnet(s) are used to produce a magnetic field that attracts or repels the magnet assembly 300. The electromagnet(s) can be activated to move the magnet assembly 300 to a given position. The one or more electromagnets are deactivated when the magnet assembly 300 is at the given position. A current applied to the coil assembly 304 can then be used to move the magnet assembly 300 and produce a haptic output. In some embodiments, the attachment mechanism may be a mechanical switch that is configured to position the shaft 600 in at least two different positions. For example, the switch may adjust the position of a movable arm that is attached to the shaft 600.

When the shaft 600 is positioned a given distance from the interior surface of the input device 108 (FIG. 6A), a current can be applied to the coil assembly 304 to move the frame 306 and the magnet assembly 300 in one direction or in an oscillating manner (as represented by arrow 608) along the body 601 to produce haptic output within the enclosure 102. The haptic output is not applied or transferred directly to the input device 108 because the contact area 602 is not in contact with the input device 108.

When a haptic output is to be applied directly to the input device 108, the biasing mechanism adjusts the position of the shaft 600 so that the contact area 602 contacts the interior surface of the input device 108 (see FIG. 6B). A current is applied to the coil assembly 304 to move the magnet assembly 300 and the frame 306 in one direction or in an oscillating manner (in two opposing directions) along the body 601. The haptic output is applied (or the momentum of the haptic output is transferred) directly to the input device 108 through the contact area 602. The haptic output created by the moving mass of the frame 306 and the magnet assembly 300 may be perceived by a user as haptic feedback on the input device 108.

Figure 7A:
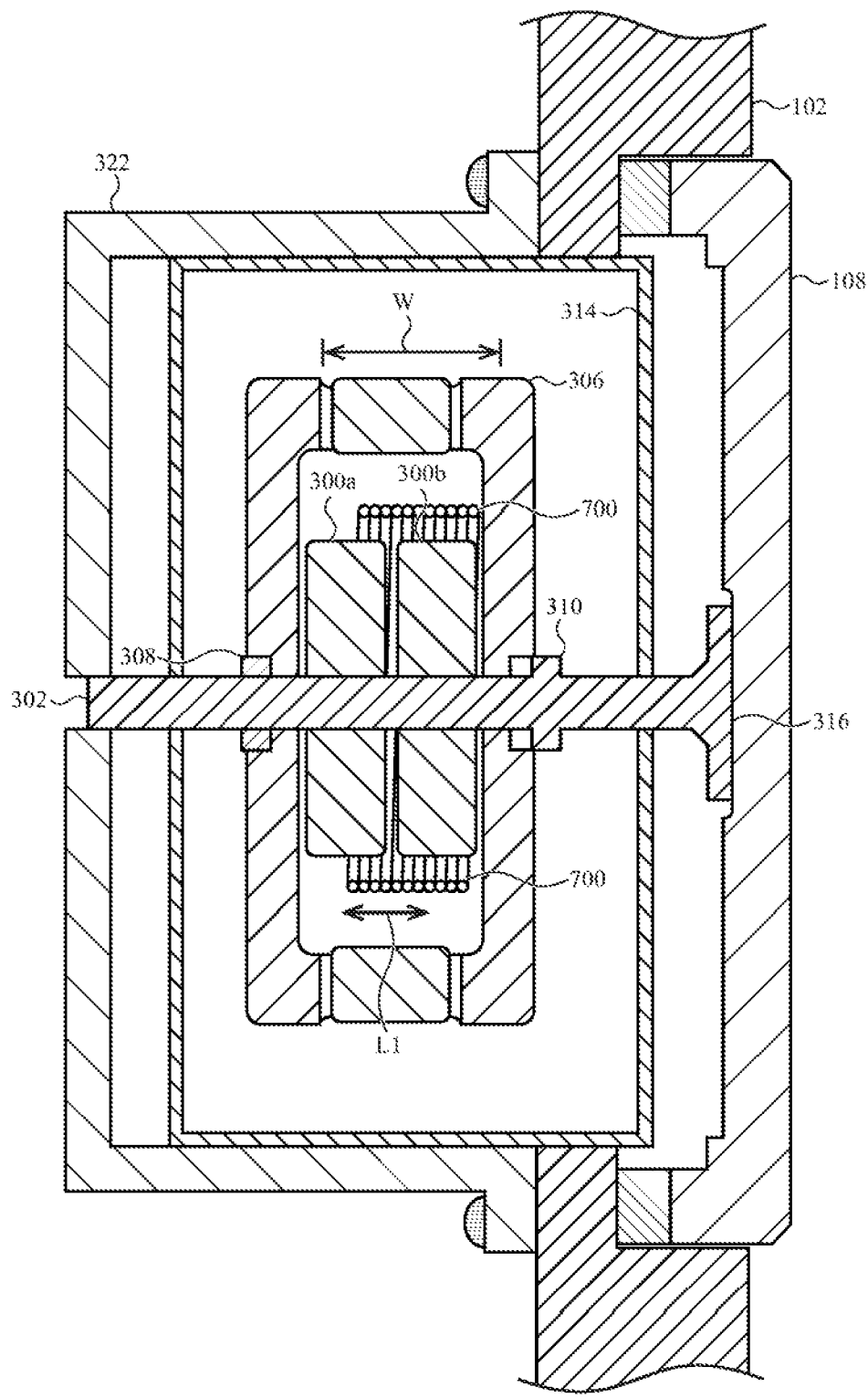
FIGS. 7A-7B depict a simplified cross-sectional view of a fifth example of the electronic device taken along line A-A in FIG. 1.
Figure 7B:
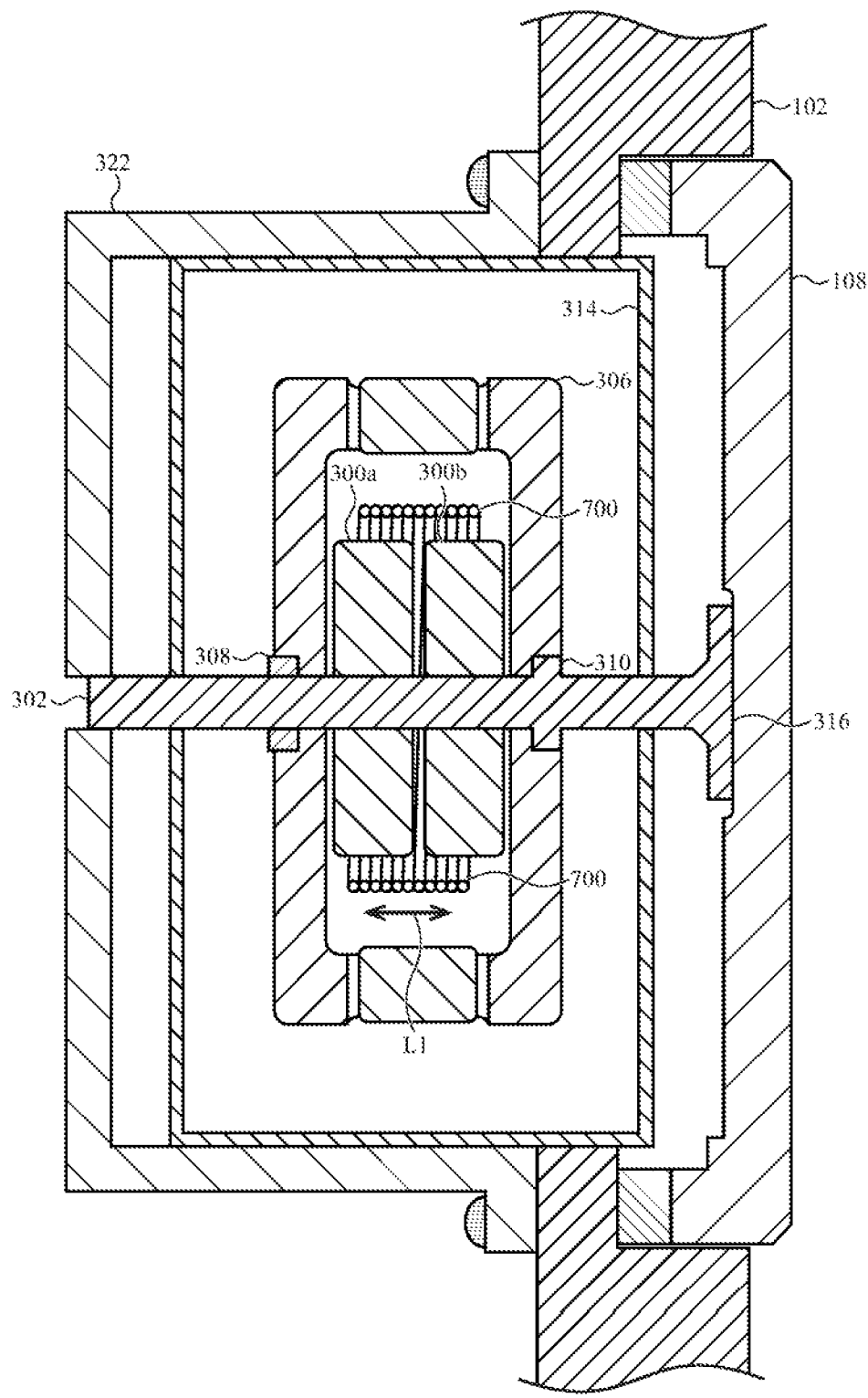

FIGS. 7A-7B show an alternate haptic engine that can be situated in multiple positions. In this embodiment, the width (W) of the coil assembly 700 is greater than the width of the magnet assembly 300. The coil assembly 700 can include one or more coils. For example, a single coil having a width (W) can be used in some embodiments. Alternatively, two coils having a combined width (W) can be positioned side-by-side about the shaft 302 and magnet assembly 300. Each coil can be energized independently to move the frame 306 and the magnet assembly 300 to a given position along the shaft 302 and to produce a haptic output once the magnet assembly 300 and the frame 306 are situated at the given location. Alternatively, in some embodiments both coils may be energized to move the magnet assembly 300 and the frame 306 to produce the haptic output.

In this example, the shaft 302 includes a contact area 316 that is attached to the input device 108 and a collar 310 that is disengagably coupled to the frame 306. When a haptic output is to be produced within the electronic device, but not applied or transferred directly to the input device 108, a current is passed through the coil assembly 700 to produce a magnetic field that causes the magnet assembly 300 to move in a direction away from the input device 108. The magnet assembly 300 can be positioned at a first location within the housing 314 (FIG. 7A). In this position, the collar 310 of the shaft 302 is disengaged with respect to the frame 306.

After the magnet assembly 300 is situated at the first position, another current is passed through the coil assembly 700 to produce a magnetic field that causes the magnet assembly 300 and the frame 306 to move in one direction or in an oscillating manner (in two opposing directions) to produce the haptic output. For example, the magnet assembly 300 can move a length L1 along the shaft 302 when moving in an oscillating manner to produce the haptic output within the enclosure 102.

When a haptic output is to be applied directly to the input device 108, a current is passed through the coil assembly 700 to produce a magnetic field that causes the magnet assembly 300 to move in a direction toward the input device 108. The magnet assembly may be positioned at a second location within the housing 314 (FIG. 7B). In this position, the collar 310 of the shaft 302 is engaged with the frame 306. After the magnet assembly 300 is situated at the second position, another current is passed through the coil assembly 700 to produce a magnetic field that causes the magnet assembly 300 and the frame 306 to move in one direction or in an oscillating manner (in two opposing directions) to produce the haptic output. For example, as shown in FIG. 7B, the magnet assembly 300 can move a length L1 when moving in an oscillating manner to produce the haptic output.

Figure 8:
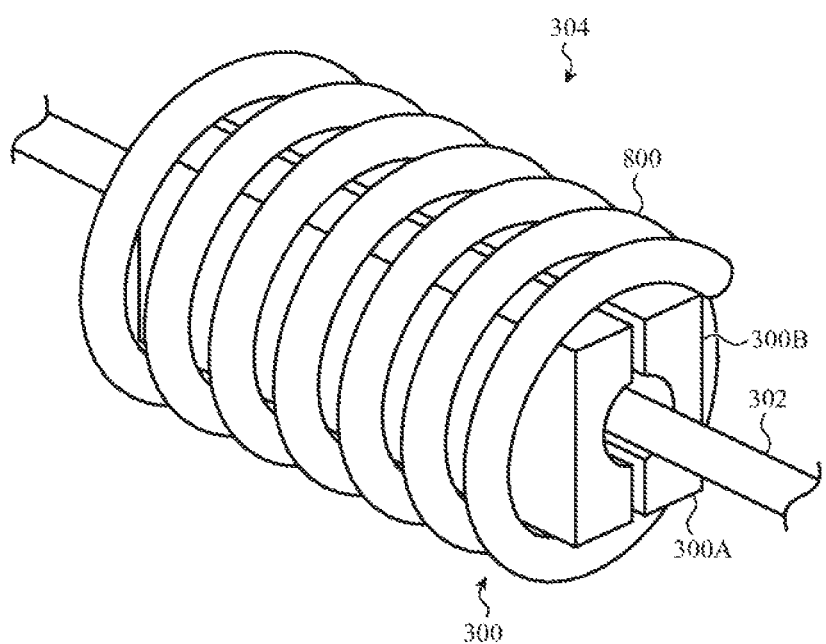
FIG. 8 depicts one example of the coil and magnet assemblies that are suitable for use in the haptic devices shown in FIGS. 2-7.

FIG. 8 depicts one example of the coil and magnet assemblies that are suitable for use in the haptic engines shown in FIGS. 2-7. The first and second magnets 300*a*, 300*b* of the magnet assembly 300 are positioned about the shaft 302. As described earlier, the magnets 300*a*, 300*b* have opposite polarities. For example, the north pole of magnet 300*a* can be adjacent to the south pole of magnet 300*b*.

A coil assembly 304 is formed with a coil 800 that encircles the magnets 300*a*, 300*b*. As described earlier, in one embodiment the magnets 300*a*, 300*b* move in a direction aligned with the shaft 302 when a haptic output signal is transmitted through the coil 800. The coil 800 can be stationary or move with respect to the magnets 300*a*, 300*b*. Additionally, a width of the coil 800 can be greater than, less than, or substantially the same as the width of the magnet assembly 300.

Figure 9:
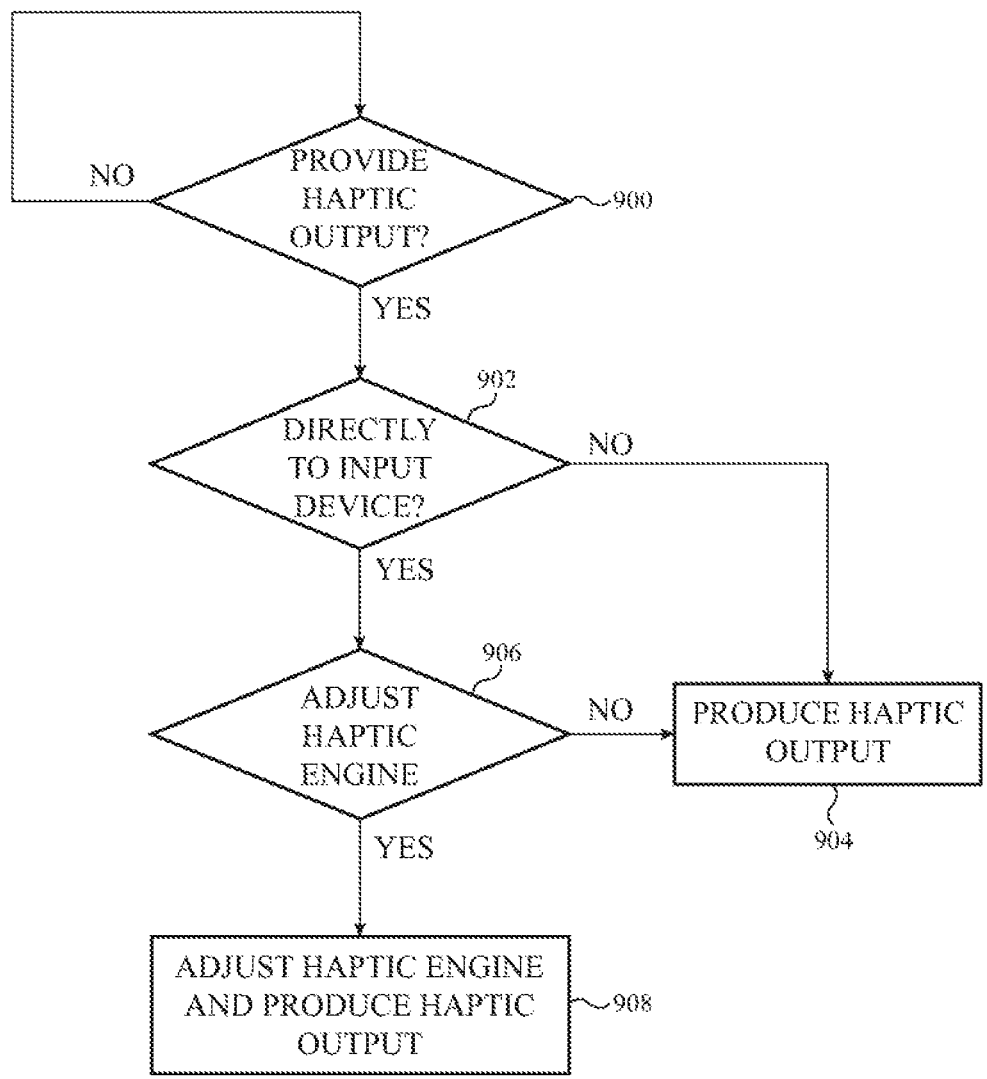
FIG. 9 shows a flowchart of a method of operating an electronic device.

FIG. 9 shows a flowchart of a method of operating an electronic device. The method of FIG. 9 may be applied using, for example, haptic engines described above with respect to FIGS. 2-8. In particular, the method of FIG. 9 may be used to operate a haptic engine in two (or more) modes. A first mode may allow the haptic output to be applied directly to an exterior surface of the input device. A second mode may allow the haptic output to be delivered via another exterior surface of the device. In general, the operations of the method of FIG. 9 may be performed by a processing unit or other logical element of the electronic device.

At block 900, a determination is made as to whether a haptic output is to be produced. In particular, the device may determine whether a haptic output is to be produced in response to a user input (received at an input device) or in response to another event. Other events include, for example, notifications, alerts, alarms, and other events that may be signaled to a user. If the determination is negative, the method returns to block 900.

In response to a positive determination at block 900, the process continues at block 902. At block 902, a determination is made as to whether the haptic output is to be applied directly to an input device. If the haptic output will not be applied directly to the input device, the method passes to block 904 where the device produces the haptic output. The device may determine that the haptic output is not to be applied directly to the input device because the haptic output is associated with one or more non-user input events including, for example, a notification, alert, or alarm. In some cases, the haptic output of block 904 corresponds to a second mode in which a general haptic output that is delivered to an exterior surface of the electronic device. The exterior surface may include, but is not limited to, an exterior surface of the input device.

If the haptic output will be applied directly to the input device (and/or the momentum of the haptic output transferred directly to the input device), the process continues at block 906. At block 906, the device makes a determination as to whether a haptic engine or haptic device should be adjusted. For example, the mode of the haptic engine or the haptic device may be changed so that a shaft or other element of the haptic engine engages the input device. Additionally or alternatively, one or more characteristics of a haptic output signal that is received by the haptic engine or the haptic device can be adjusted. For example, a frequency, amplitude, and/or a phase of the haptic output signal may be changed. Adjusting one or more of the characteristics of the haptic output signal can adjust the magnitude and/or the type of haptic output. If the haptic engine or haptic device will not be adjusted, the method passes to block 904 where the haptic output is produced.

If the haptic engine or haptic device will be adjusted, the process continues at block 908 where the haptic engine is adjusted and the haptic output is produced. The haptic output of block 908 may correspond to a first mode in which a localized haptic output that is delivered to the input device. For example, the localized haptic output may be concentrated or focused on an exterior surface of the input device and used to provide haptic feedback or acknowledgement of a user action received using the input device.

Figure 10:
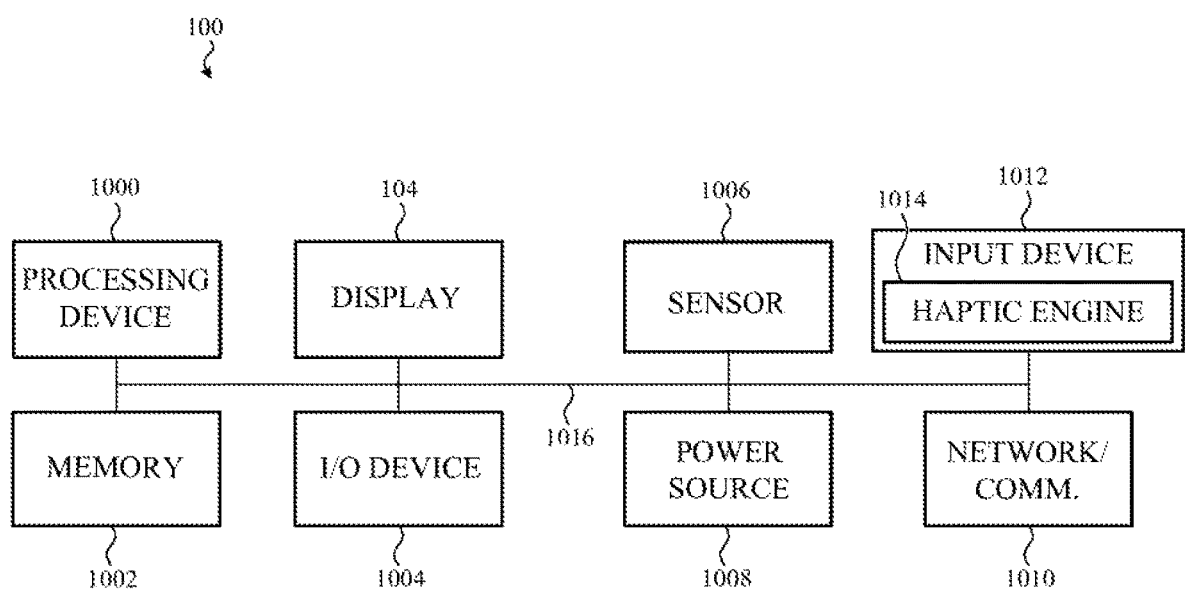
FIG. 10 is an illustrative block diagram of the electronic device shown in FIG. 1.

FIG. 10 is an illustrative block diagram of the electronic device shown in FIG. 1. The electronic device 100 can include the display 104, one or more processing units 1000, memory 1002, one or more I/O devices 1004, one or more sensors 1006, a power source 1008, a network communications interface 1010, and an input device 1012 that includes a haptic engine 1014. The processing unit(s) 1000 can control or coordinate some or all of the operations of the electronic device 100. The processing unit(s) 1000 can communicate, either directly or indirectly, with substantially all of the components of the electronic device 100. For example, a system bus or signal line 1016 or other communication mechanism can provide communication between the processing unit(s) 1000, the memory 1002, the I/O device(s) 1004, the sensor(s) 1006, the power source 1008, the network communications interface 1010, and/or the input device 1012 and haptic engine 1014. The one or more processing units 1000 can be implemented as any electronic device capable of processing, receiving, or transmitting data, instructions, and/or program code. For example, the processing unit(s) 1000 can each be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

In some embodiments, the processing unit(s) 1000 and the processing device 202 (FIG. 2) are the same processing unit. Alternatively, data processing, inputs, and outputs can be distributed between the processing unit(s) 1000 and the processing device 202. In embodiments where the one or more processing units 1000 and the processing device 202 are the same processing unit(s), the processing unit(s) 1000 is configured to receive or be responsive to an input device signal from the input device 1012. The input device signal indicates an input action that is associated with an input device 1012 has occurred. Additionally, in response to the receipt of the input device signal, the processing device(s) 1000 is configured to cause a haptic output signal to be transmitted to a coil assembly in the haptic engine 1014. The haptic engine 1014 produces a haptic output based on the haptic output signal.

The memory 1002 can store electronic data that can be used by the electronic device 100 and instructions and/or program code that is executed by the processing unit(s) 1000. For example, a memory can store electrical data or content such as, for example, audio and video files, documents and applications, device settings and user preferences, timing and control signals or data for the haptic device 1012 (or one or more components included therein), data structures or databases, and so on. The memory 1002 can be configured as any type of memory. By way of example only, the memory can be implemented as random access memory, read-only memory, Flash memory, removable memory, or other types of storage elements, or combinations of such devices. The one or more I/O devices 1004 can transmit and/or receive data to and from a user or another electronic device. The I/O device(s) 1004 can include a touch sensing input surface such as a track pad, one or more buttons, one or more microphones or speakers, one or more ports such as a microphone port, and/or a keyboard.

The electronic device 100 may also include one or more sensors 1006 positioned substantially anywhere on the electronic device 100. The sensor(s) 1006 may be configured to sense substantially any type of characteristic, such as, but not limited to, images, pressure, light, touch, force, biometric data, temperature, position, motion, and so on. For example, the sensor(s) 1006 may be an image sensor, a temperature sensor, a light or optical sensor, an atmospheric pressure sensor, a proximity sensor, a humidity sensor, a magnet, a gyroscope, a biometric sensor, an accelerometer, and so on.

The power source 1008 can be implemented with one or more devices capable of providing energy to the electronic device 100. For example, the power source 1008 can be one or more batteries or rechargeable batteries. Additionally or alternatively, the power source 1008 may be a connection cable that connects the electronic device to another power source, such as a wall outlet or another electronic device.

The network communication interface 1010 can facilitate transmission of data to or from other electronic devices. For example, a network communication interface 1010 can transmit electronic signals via a wireless and/or wired network connection. Examples of wireless and wired network connections include, but are not limited to, cellular, Wi-Fi, Bluetooth, infrared, and Ethernet.

The input device 1012 can be any suitable input device that is configured to provide a haptic feedback to a user in response to an input action. For example, the input device 1012 can be an input button, a crown, a section of the enclosure, and/or a display.

The haptic engine 1014 can be implemented as any suitable device configured to provide force feedback, vibratory feedback, tactile sensations, and the like. For example, in one embodiment, the haptic engine 1014 can be implemented as an electromagnetic actuator (e.g., linear actuator) configured to provide a punctuated haptic feedback, such as a tap or a knock. Additionally or alternatively, the electromagnetic actuator may be configured to translate in two directions to provide a vibratory haptic feedback.

It should be noted that FIG. 10 is exemplary only. In other examples, an electronic device may include fewer or more components than those shown in FIG. 10. Additionally or alternatively, an electronic device can be included in a system and one or more components shown in FIG. 10 is separate from the electronic device but in communication with the electronic device. For example, an electronic device may be operatively connected to, or in communication with a separate display. As another example, one or more applications or data can be stored in a memory separate from an electronic device. In some embodiments, the separate memory can be in a cloud-based system or in an associated electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic watch comprising:
   a housing;
   a band coupled to the housing and configured to secure the housing to a user;
   a touch-sensitive display at least partially enclosed by the housing;
   a solid-state button positioned at a sidewall of the housing and configured to receive an input, the solid-state button comprising:
      a force sensor configured to produce a signal that corresponds to an input force associated with the input; and
      a haptic actuator positioned within the housing and configured to produce a haptic output along an exterior surface of the solid-state button; and
   a processing device operably connected to the force sensor and the haptic actuator, the processing device configured to cause the haptic actuator to produce the haptic output in response to the signal exceeding an actuation threshold.

2. The electronic watch of claim 1, wherein the force sensor comprises a force sensing layer positioned between the solid-state button and the housing.

3. The electronic watch of claim 2, wherein:
   the force sensing layer comprises first and second electrodes separated by a compliant material; and
   the signal is based on a change in capacitance between the first and second electrodes.

4. The electronic watch of claim 1, wherein:
   the haptic output is a first haptic output;
   the actuation threshold is a first actuation threshold; and
   the processing device is further configured to cause the haptic actuator to produce a second haptic output, different from the first haptic output, in response to the signal exceeding a second actuation threshold.

5. The electronic watch of claim 1, wherein the processing device is configured to cause the touch-sensitive display to perform a display function in response to the signal exceeding the actuation threshold.

6. The electronic watch of claim 5, wherein:
   the display function is a first display function;
   the actuation threshold is a first actuation threshold; and
   the processing device is further configured to cause the touch-sensitive display to perform a second display function in response to the signal exceeding a second actuation threshold.

7. The electronic watch of claim 1, wherein the haptic actuator comprises:
   a shaft coupled to the solid-state button;
   a magnet coupled to the shaft; and
   a coil assembly at least partially surrounding the magnet and operably coupled to the magnet, the coil assembly configured to cause a movement of the magnet and the shaft thereby producing the haptic output.

8. The electronic watch of claim 7, further comprising an actuator housing at least partially surrounding the magnet, wherein the coil assembly is attached to the actuator housing.

9. A wearable electronic device comprising:
   a housing;
   a display at least partially enclosed by the housing;
   an input device coupled to the housing and having an input surface;

a haptic engine coupled to the input device, the haptic engine comprising:
   a magnet assembly; and
   a coil assembly operably coupled to the magnet assembly;
a force sensor positioned between the input device and the housing; and
a processing device operably coupled to the haptic engine and the force sensor and configured to:
   detect an input action provided to the input surface;
   detect a force of the input action based on an output of the force sensor; and
   in response to the force exceeding a threshold, cause a movement between the magnet assembly and the coil assembly to produce a haptic output.

10. The wearable electronic device of claim 9, wherein the force sensor further comprises:
a first electrode layer fixed with respect to the input device;
a second electrode layer fixed with respect to the housing; and
a dielectric material positioned between the first and second electrode layers.

11. The wearable electronic device of claim 10, wherein:
the first electrode layer comprises multiple first electrodes; and
the second electrode layer comprises multiple second electrodes, each aligned with a respective first electrode of the multiple first electrodes.

12. The wearable electronic device of claim 10, wherein the output of the force sensor is based on a change in capacitance between the first electrode layer and the second electrode layer.

13. The wearable electronic device of claim 10, wherein the dielectric material comprises a compliant material configured to compress in response to the input action.

14. The wearable electronic device of claim 9, wherein the force sensor is positioned at least partially around a perimeter of the input device.

15. The wearable electronic device of claim 9, wherein the wearable electronic device comprises an electronic watch that is configured to be worn on a wrist of a user.

16. The wearable electronic device of claim 9, wherein:
the threshold is a first threshold;
the haptic output is a first haptic output; and
the processing device is further configured to cause the coil assembly to produce a second haptic output, different from the first haptic output, in response to the force exceeding a second threshold.

17. An electronic watch comprising:
a housing defining a portion of an outer surface of the electronic watch;
an input device configured to receive a user input;
a force sensor operably coupled to the input device and configured to generate a force input signal in response to the user input;
a processing device configured to cause a generation of a haptic output signal in response to the force input signal; and
an electromagnetic actuator mechanically coupled to the input device, the electromagnetic actuator comprising:
   a magnet assembly; and
   a coil assembly configured to cause the magnet assembly to generate a haptic output in response to receiving the haptic output signal.

18. The electronic watch of claim 17, wherein the force sensor is positioned between the housing and the input device.

19. The electronic watch of claim 17, wherein the input device is an input button and the user input comprises a press of the input button.

20. The electronic watch of claim 17, wherein the input device comprises:
a central section that is coupled to the electromagnetic actuator; and
a peripheral section that is coupled to the force sensor.

* * * * *